United States Patent [19]

Olofsson et al.

[11] Patent Number: 4,681,241

[45] Date of Patent: Jul. 21, 1987

[54] VENDING MACHINE

[75] Inventors: Lars Olofsson; Martin Hospers, both of Gothenburg, Sweden

[73] Assignee: AB Betjänten, Sweden

[21] Appl. No.: 675,836

[22] PCT Filed: Feb. 28, 1984

[86] PCT No.: PCT/SE84/00069

§ 371 Date: Oct. 22, 1984

§ 102(e) Date: Oct. 22, 1984

[87] PCT Pub. No.: WO84/03425

PCT Pub. Date: Sep. 13, 1984

[30] Foreign Application Priority Data

Mar. 2, 1983 [SE] Sweden ............................... 8301149

[51] Int. Cl.[4] ......................... B65G 59/00; B65G 3/44

[52] U.S. Cl. .................................... 221/124; 221/188; 221/209

[58] Field of Search ............... 221/123, 124, 186, 188, 221/189, 209, 100, 98, 93, 92, 67, 23, 22, 105, 270, 129; 206/44.12, 559; 414/125, 126, 127, 128, 131

[56] References Cited

U.S. PATENT DOCUMENTS

| | | | |
|---|---|---|---|
| 918,886 | 4/1909 | Mills | 221/188 X |
| 2,996,218 | 8/1961 | Lux | 221/188 |
| 3,139,168 | 6/1964 | Stein | 221/188 X |
| 3,185,281 | 5/1965 | Gross | 221/129 |
| 3,750,831 | 8/1973 | Souza et al. | 221/188 |

FOREIGN PATENT DOCUMENTS

| | | | |
|---|---|---|---|
| 94903 | 1/1897 | Fed. Rep. of Germany | 221/188 |
| 31646 | 3/1910 | Sweden | 221/188 |
| 322206 | 11/1929 | United Kingdom | 221/124 |

*Primary Examiner*—Joseph J. Rolla
*Assistant Examiner*—David H. Bollinger
*Attorney, Agent, or Firm*—Wegner & Bretschneider

[57] ABSTRACT

A vending machine having a casing enclosing a tiltable hopper cooperating with a feeding-out device. The hopper is suspended upon shelves located at the side walls of the casing, and comprises two series of pockets arranged back to back, the hopper being tiltable in two directions. The hopper does not have any permanent attachment to the tilting mechanism or to the feeding-out device, and can thus easily be fitted into the casing and be removed therefrom, respectively.

6 Claims, 9 Drawing Figures

Figure 1:
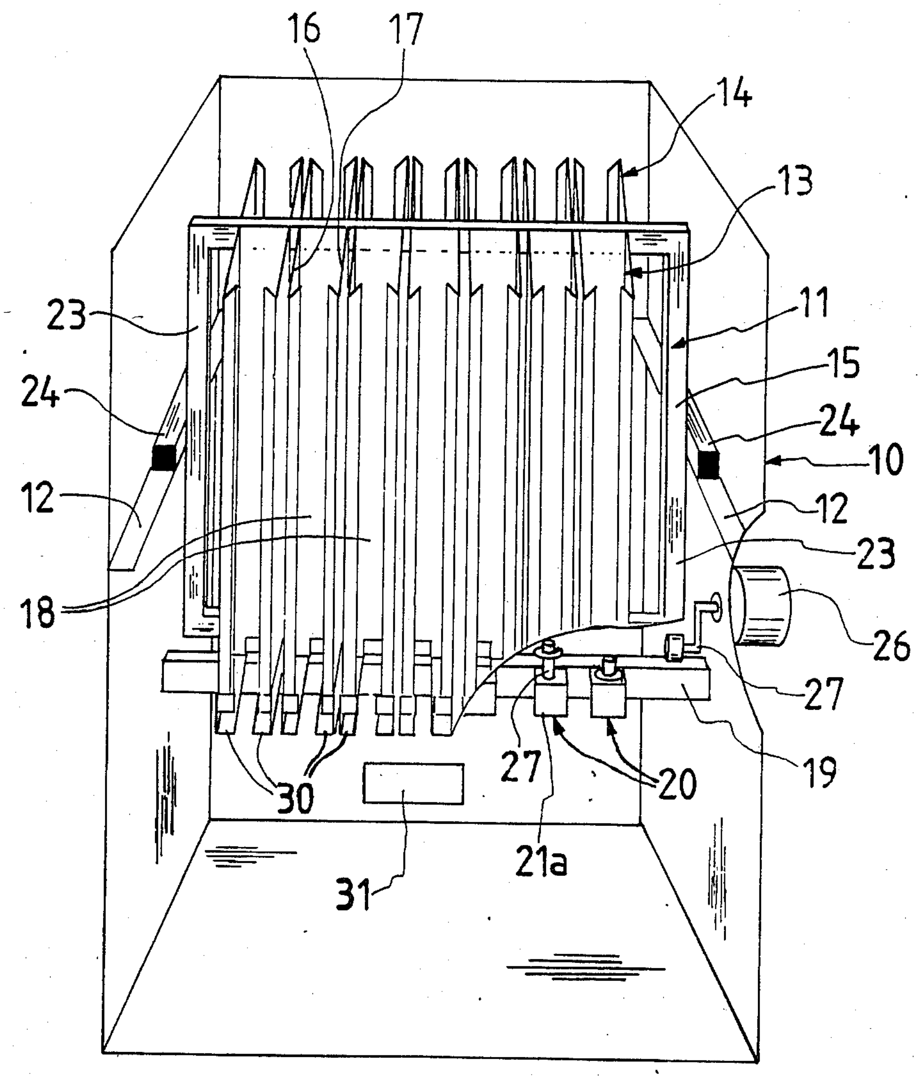

FIG. 4
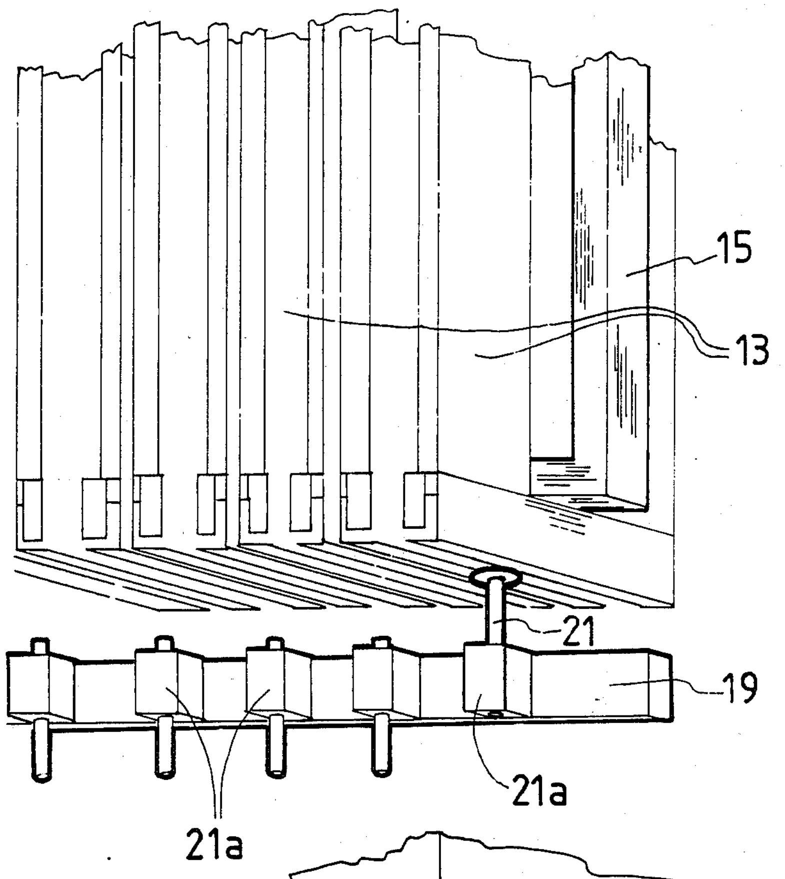
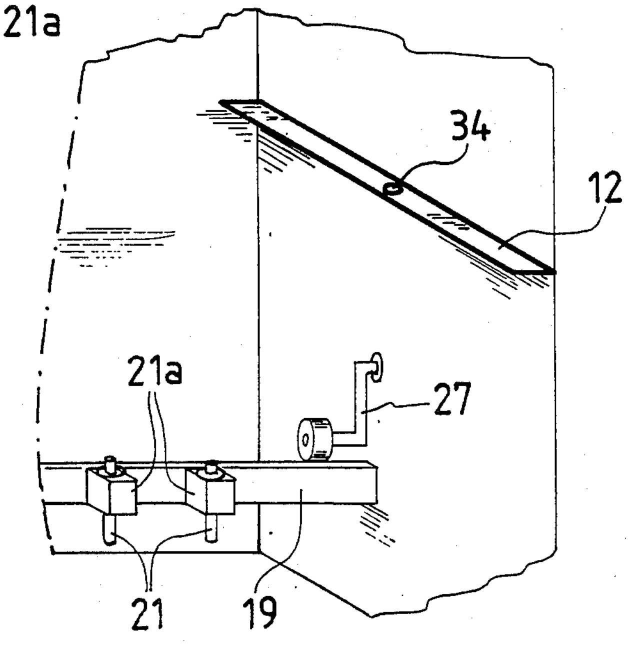
FIG. 5

FIG. 6
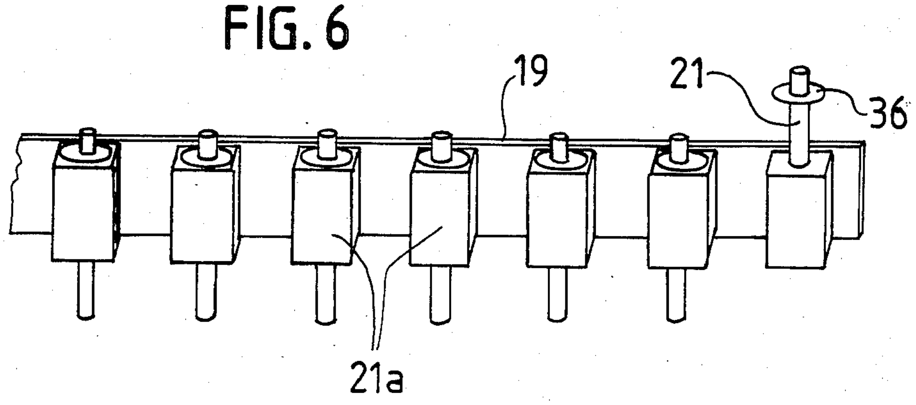
FIG. 7
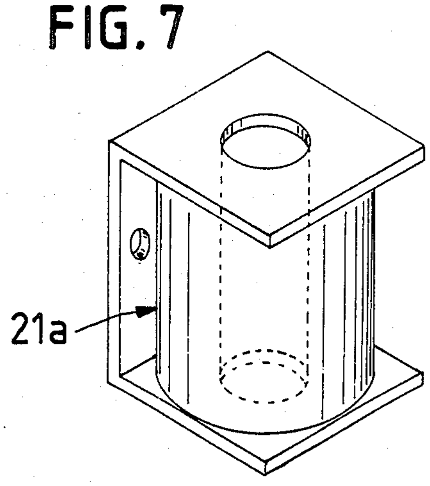
FIG. 8
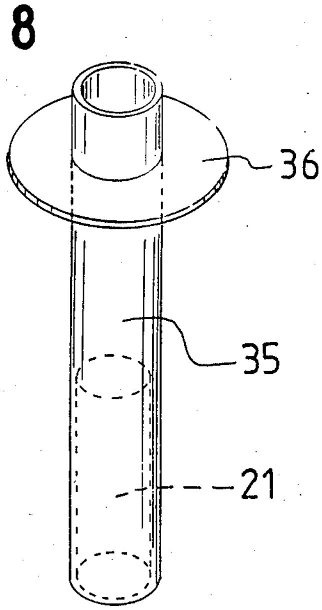
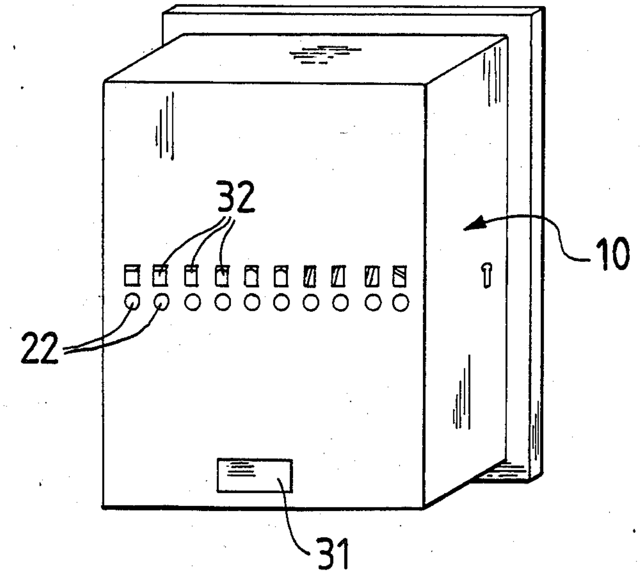
FIG. 9

VENDING MACHINE

The present invention refers to a vending machine, and more specifically to a machine having a tiltable hopper, which is suspended in an enclosing casing.

The aim of the invention is to provide a compact unit, with an easily mounted and dismounted hopper, where the surrounding equipment satisfies high demands upon operational reliability.

Hoppers which are tiltable or rotatable are known in various vending machines. Tiltable hoppers have suffered from the drawback that the space within the casing is unsatisfactorily used, and the capacity of the hopper will furthermore be limited.

The aim of the present invention is to set aside these drawbacks, and propose an advantageous alternative.

The invention thus refers to a vending machine comprising a hopper enclosed in a casing and cooperating with a feeding out device and is characterized in that the hopper includes a carrier and goods receiving pockets attached thereto, the carrier being supported in the casing so it can tilt about supports located at its vertical side faces, the hopper, in a rest position, lacking contact with the mechanism causing the tilting as well as with the feeding out device.

The hopper is preferably tiltable in two opposite directions and comprises then two series of pockets arranged back to back.

The supports for the hopper, at each vertical side face of the carrier, preferably provide at least two horizontally, spaced-apart points of suspension. These points of suspension can advantageously be provided by an elongate support member located transversely to the carrier at each of its vertical faces. Each elongate member is preferably provided with a downwardly directed peg adapted to fit into a mating hole in a horizontal shelf at the adjacent side wall of the casing.

The feeding-out mechanism preferably includes a number of actuators corresponding to the number of pockets in the hopper, and is located below the carrier, a selected actuator being adapted to be raised into contact with lowermost piece of goods in the associated pocket simultaneously with the hopper being tilted. Each actuator in the feeding-out device advantageously comprises a solenoid having a vertically displaceable core provided with a stop adapted to be adjusted in the longitudinal direction of the core, corresponding to the thickness of the pieces of goods stored.

The tilting mechanism preferably includes an electric motor having a crank arm mounted upon its shaft, and is mounted so as to contact the carrier at a distance from the adjacent support member. In a machine having a hopper tiltable in two directions the electric motor may be of the reversible type.

Each hopper pocket is preferably provided with side walls being resilient transversely to the vertical extension of the pocket, and being continued by portions of a front wall, said portions between themselves defining a slot running along the front wall. The slot at its lower end is preferably provided with goods retaining members.

Figure 2:
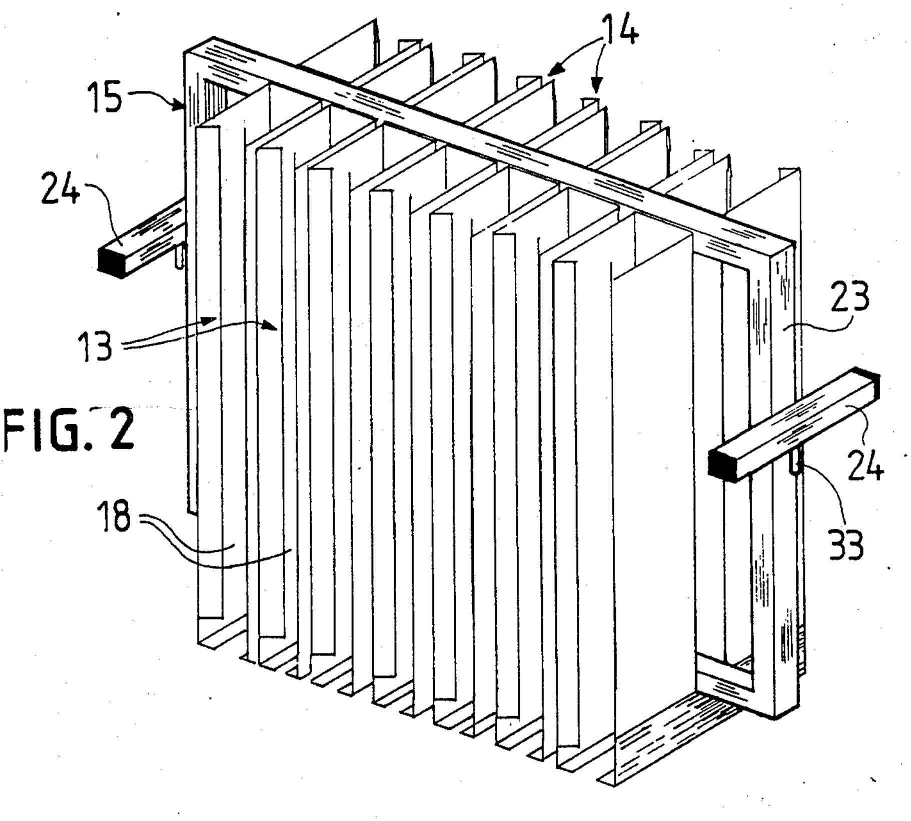
Figure 3:
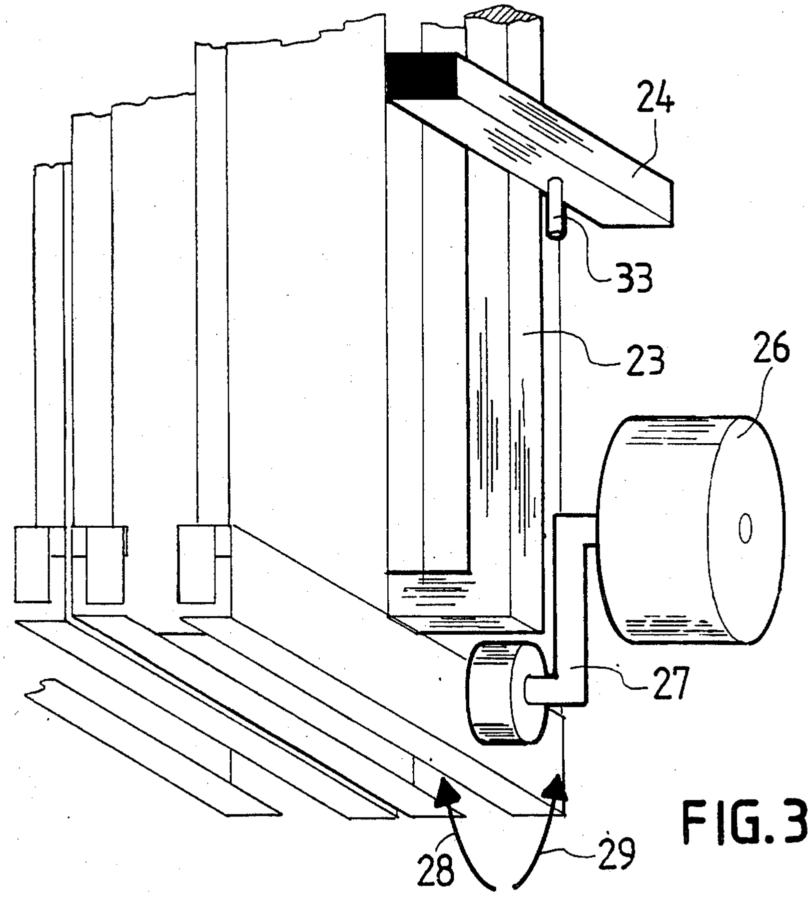

The invention will be described below with reference to the accompanying drawings, in which FIG. 1 is a diagramatic perspective view of an opened casing for a vending machine having a tiltable hopper, FIG. 2 shows a perspective view of the hopper, FIG. 3 schematically shows part of the tilting mechanism, FIG. 4 in a simplified perspective view shows part of the hopper with the associated feeding-out device, FIG. 5 shows part of a side wall of the casing with a suspension shelf, FIG. 6 shows a portion of a battery of solenoids, FIG. 7 shows the armature of a solenoid, FIG. 8 shows the core of a solenoid, and FIG. 9 shows a perspective, external view of a vending machine including the invention.

Reference 50 in FIG. 1 denotes the casing of a vending machine, in which a hopper 11 is suspended from shelves 12. The hopper is composed of a number of vertical pockets 13, 14 arranged back to back (FIG. 2), and includes a carrier 15 in the form of a frame of light metal tubing, which simplifies the handling of the hopper as will be evident from the following description. The hopper pockets are preferably manufactured from some light and resilient material, such as plastics, so at least the side walls 16, 17 separating the pockets will be flexible transversely to the vertical direction of the pocket. A slot 18 in the front wall of each pocket may thus be expanded, which means that goods may be fed into the pockets directly from the front of the hopper.

A number of feeding-out devices 20 (only a few of them are shown in FIG. 1) corresponding to the number of pockets are mounted upon a bar 19 extending through the casing 10. Each feeding-out device comprises a displaceable core 21 of a solenoid 21*a*, which is activated, for instance by a microcomputer, depending upon the selection of goods. The selection is made by means of push buttons 22 provided at the front face of the casing (FIG. 9).

About midway of each vertical member 23 of the carrier frame 15 an elongate member 24 is fitted, transversely to the frame, for suspending the hopper 11 upon the shelves 12 at the side walls of the casing 10. These elongate members will provide a horizontally extended support for the hopper, which means that a possible oblique loading of the hopper will not detrimentally affect the function. This suspension will provide two horizontally spaced-apart points of contact during the tilting of the hopper, and ensures that the hopper is always automatically brought back to its vertical position after a tilting movement.

The vertical frame member 23 at one end of the hopper 11 serves as a contact face for the mechanism causing the tilting of the hopper in relation to the support formed by the shelves 12. The mechanism includes a reversible electric motor 26, having a crank arm 27 mounted upon its shaft. From a rest position shown in FIG. 3, the crank arm may be rotated in the direction of either of the arrows 28, 29, and will, upon contacting the appropriate side face of the frame member 23, cause a tilting of the hopper in the desired direction. The shaft of the electric motor will rotate one turn only on each occasion, and the activation of the motor advantageously occurs from the microcomputer operating the solenoids.

A core 21 in a selected solenoid 21*a*, will be raised in step with the crank arm, preferably so it slips in below the lowermost piece of goods in the selected pocket and, during the tilting of the hopper, "pushes" that piece of goods past a stop 30 at the lower end of the slot in the front wall. The piece of goods will then pass on to a lided opening 31 in the front wall of the casing, by way of a chute (not shown).

FIG. 2 shows the hopper 11 removed from the casing, and FIG. 3 shows a detail at the lower corner of the carrier frame 15, actuated by the crank mechanism. The hopper is completely free of the tilting and feeding-out mechanisms, so it can easily be lifted out of the casing for re-stocking.

There are preferably two hoppers available, so one restocked unit can rapidly substitute the partly emptied unit, removed from the casing.

The goods pockets all have the same size in the embodiment shown, for instance adapted to receive packets of cigarettes, but it is evident that the size of the pockets may vary, also within the same hopper, to accomodate bars of chocolate, or packets of candy or the like. The kind of goods in the various packets is indicated on labels 32, adjacent to the push buttons 22 at the front face of the casing.

Each tilting member 24 is provided with a centrally located, downwardly directed peg 33, which fits into a mating hole 34 in the shelf 12 (FIG. 5). Hereby the hopper will be secured in relation to the casing, and the pegs will slide up and down in their holes 34 so the tilting movement will not be obstructed.

FIG. 4 shows the lower portions of a hopper, and illustrates how a core 21 has been lifted in relation to the solenoid armature 21*a* in order to push upon a selected piece of goods.

FIG. 5 shows a portion of the casing, when the hopper has been removed, and illustrates the relative position of the shelf 12, the crank arm 27 and the bar 19 carrying the solenoids 21*a*.

FIG. 6 shows the bar 19 with solenoids, and FIGS. 7 and 8 show the solenoid body 21*a* and the core 21, respectively. The latter includes a tubular body 35 enclosing the magnetic core proper 21, and is provided with an axially displaceable collar 36, which acts as a stop and prevents the body 35 entering a pocket more than what corresponds to the thickness of a piece of goods. The adjustability may be obtained in some simple manner, and the collar may be retained by a locking washer of arbitrary known design.

Variations and modifications are possible within the scope of the appended claims. The feeding-out device and the actuation thereof may be selected to suit various demands. A single displaceable feeding-out member may thus be used on certain occasions.

We claim:

1. A vending machine, comprising:

(A) a hopper enclosed in a casing and adapted to cooperate with feeding-out means;

(B) said casing being defined by side walls, each provided with a shelf;

(C) said hopper including a generally rectangular carrier defined by side faces and supporting a number of goods receiving pockets each having a slotted bottom;

(D) support means at each side face of said carrier for freely resting upon said shelves, each of said support means including an elongate support member located transversely to the carrier to provide two horizontally spaced-apart tilting fulcrums;

(E) means for tilting said hopper about the shelf supports, and including an actuating member normally out of contact with said hopper, said actuating member operably contacting said carrier for tilting said hopper; and (F) said feeding-out means being located below said hopper and including vertically displaceable actuators in number and position corresponding to the goods containing pockets and each adapted, when selected, to project into the slot in the bottom of the associated pocket to engage the lowermost piece of goods therein.

2. A vending machine according to claim 1 wherein said hopper is tiltable in two opposite directions and comprises at least two series of pockets arranged back to back in a substantially parallel manner.

3. A vending machine according to claim 1 wherein each of said elongate support members is provided with a centrally located, downwardly directed peg adapted to slidably fit into a mating hole in the associated shelf at the adjacent side wall of the casing, and said carrier is operably coupled to said elongate support members to permit pivotal movement of said hopper.

4. A vending machine according to claim 1 wherein said tilting mechanism includes a reversible type electric motor having a crank arm mounted upon its shaft, and is mounted so as to contact the carrier at a distance below the adjacent support member.

5. A vending machine according to claim 4 wherein said hopper is tiltable in at least two opposite directions.

6. A hopper for insertion in the casing of a vending machine provided with tilting means and feeding-out means, and comprising:

(A) a generally rectangular carrier frame defined by top, bottom, and side members;

(B) a number of goods receiving pockets mounted back to back in said carrier frame, (C) said carrier frame at each of its side members having a transversely fitted, elongate support member for tilting engagement with said casing, said frame further offering a contact surface for said tilting mechanism;

(D) each of said hopper pockets is provided with side walls which are resilient transversely to the vertical extension of the pocket, and each being continued by portions of a front wall, said portions define a vertical slot running along the front wall.

* * * * *